B. F. REICHENBERGER.
STRAW SPREADING ATTACHMENT FOR MANURE SPREADERS.
APPLICATION FILED MAR. 7, 1913.

1,166,632.

Patented Jan. 4, 1916.
4 SHEETS—SHEET 2.

WITNESSES:
R. E. Hamilton
L. J. Fischer

INVENTOR:
Benedict F. Reichenberger,
BY F. G. Fischer,
ATTORNEY.

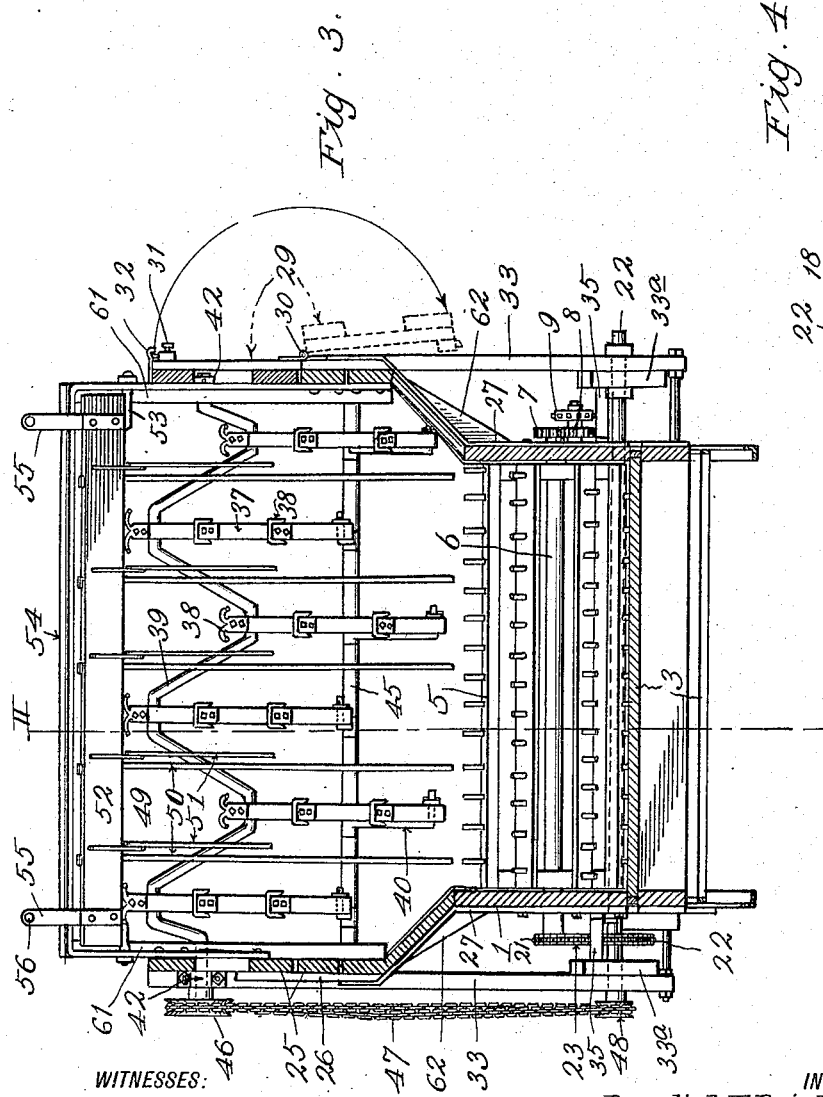
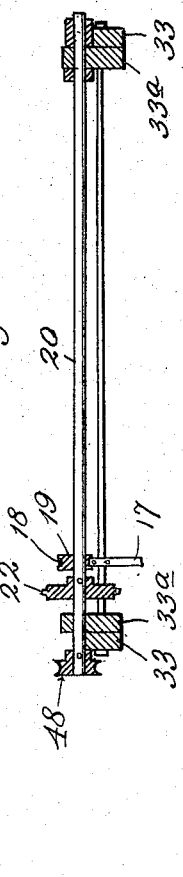

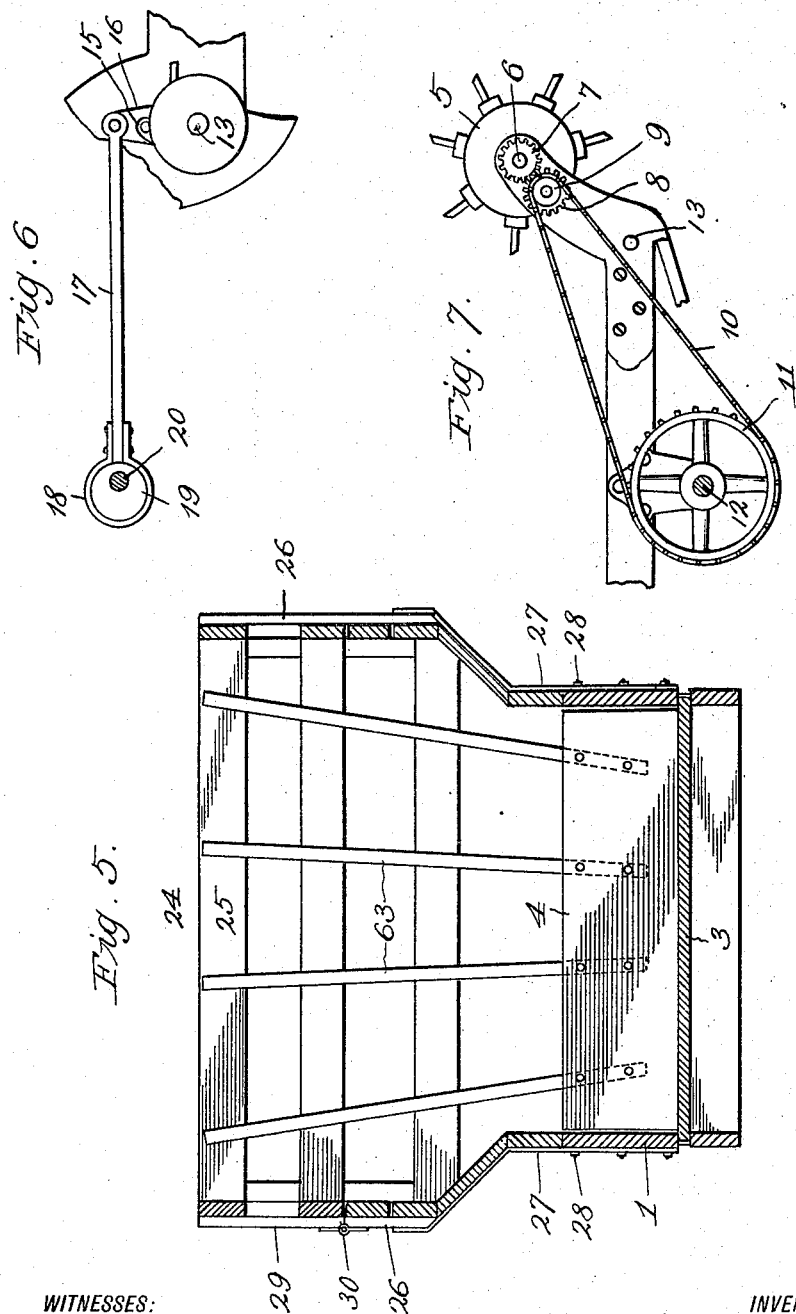

UNITED STATES PATENT OFFICE.

BENEDICT F. REICHENBERGER, OF PURCELL, KANSAS.

STRAW-SPREADING ATTACHMENT FOR MANURE-SPREADERS.

1,166,632. Specification of Letters Patent. Patented Jan. 4, 1916.

Application filed March 7, 1913. Serial No. 752,631.

*To all whom it may concern:*

Be it known that I, BENEDICT F. REICHENBERGER, a citizen of the United States, residing at Purcell, in the county of Doniphan and State of Kansas, have invented certain new and useful Improvements in Straw-Spreading Attachments for Manure-Spreaders, of which the following is a specification.

My invention relates to a straw spreading attachment for manure spreaders, and my object is to provide an efficient but simple attachment of this character which can be readily applied to a manure spreader or removed therefrom when the latter is to be employed to carry out its usual function of spreading manure.

My attachment coacts with the usual mechanism of the manure spreader and, therefore, can be manufactured at less cost than a complete straw spreader made to operate independently of a manure spreader. The attachment is automatic in operation and hence does not require an operator in addition to the operator who controls the mechanism of the manure spreader.

Figure 1:
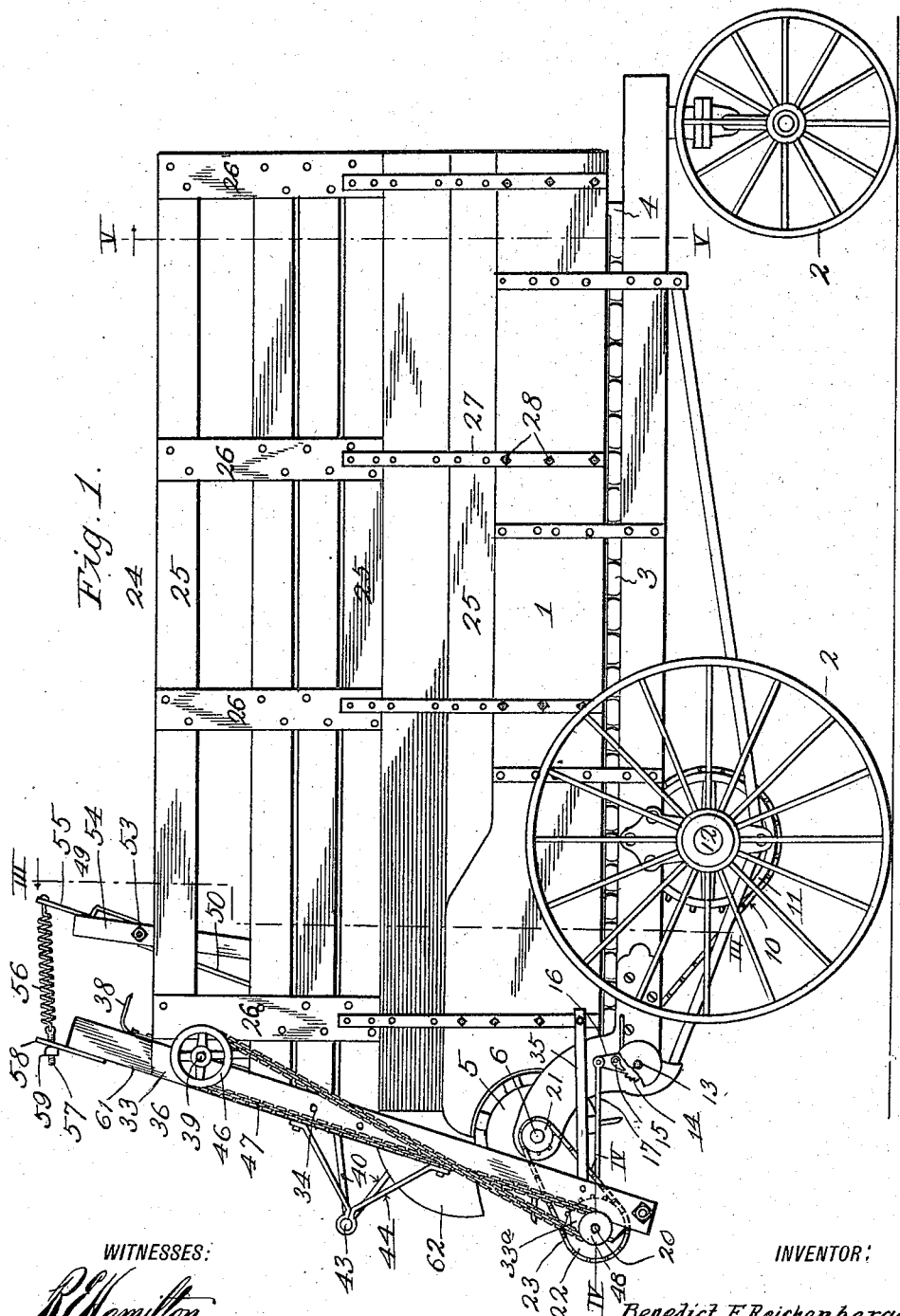
Figure 2:
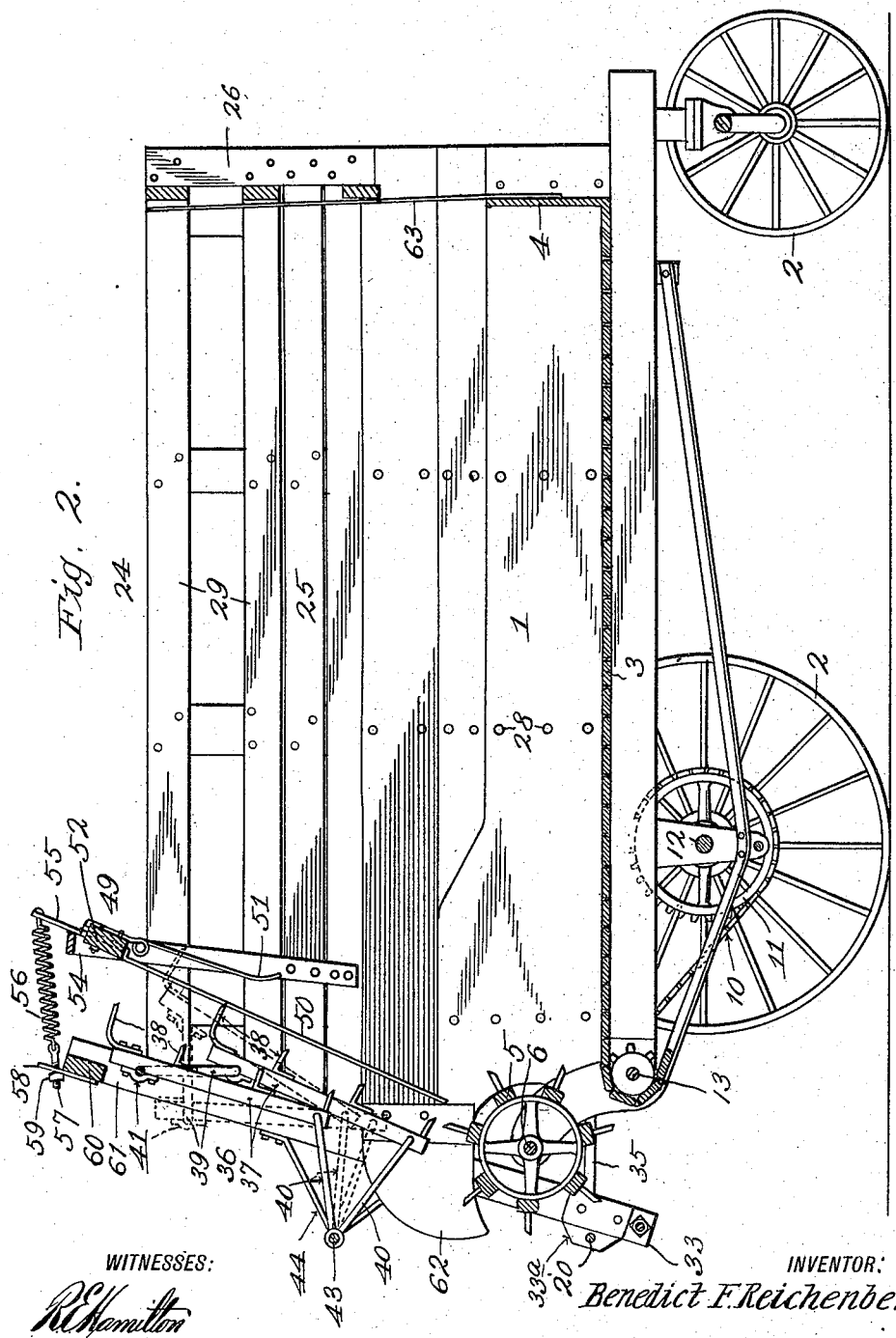

In order that the invention may be fully understood, reference will now be made to the accompanying drawings, in which:

Figure 1 is a side elevation of a manure spreader provided with my straw spreading attachment. Fig. 2 is a vertical longitudinal section taken on the plane of line II—II, Fig. 3, with front and rear wheels of the manure spreader added. Fig. 3 is a cross section taken on line III—III of Fig. 1. Fig. 4 is a section on the plane of line IV—IV of Fig. 1. Fig. 5 is a cross section on line V—V of Fig. 1. Fig. 6 is a detail side elevation partly in section of means for transmitting motion from the cylinder to my apron. Fig. 7 is a broken detail side elevation of the opposite side of the manure spreader to that disclosed by Fig. 1, and showing the usual gearing for transmitting motion from the axle to the cylinder of the manure spreader.

As the manure spreader may be of ordinary type, I have shown and will describe only enough thereof to disclose how my attachment coacts therewith.

1 designates the box, 2 the wheels, 3 the apron, 4 the end-gate on the apron, 5 the cylinder, 6 the shaft thereof, 7 a pinion fixed to one end of shaft 6, 8 a pinion intermeshing with pinion 7, 9 a sprocket wheel for driving pinion 8, 10 an endless sprocket chain for driving sprocket wheel 9, 11 a sprocket wheel fixed to the rear axle 12 of the manure spreader to drive chain 10, 13 the roller shaft for apron 3, 14 a ratchet wheel fixed to one end of said roller shaft, 15 a pawl for turning ratchet wheel 14 step by step, 16 an oscillatory lever carrying pawl 15, 17 a pitman pivotally connected at one end to the upper end of lever 16 and provided at its opposite end with an eccentric strap 18, and 19 an eccentric for actuating the pitman 17.

All of the foregoing parts are of the usual arrangement and construction, except that the eccentric 19 instead of being mounted on the shaft of cylinder 5, is mounted upon a counter shaft 20 which is driven at less speed than the cylinder, so that said counter shaft in turn will drive the apron at less than the usual speed employed when spreading manure. In other words, instead of driving the apron roller shaft 13 direct from the cylinder shaft, it is driven from the counter shaft 20, which is driven at a lower rate of speed than the cylinder shaft by sprocket gearing consisting of a relatively large sprocket wheel 22 fixed to the counter shaft 20, and an endless sprocket chain 23 extending around the sprocket wheels 21 and 22.

Referring now particularly to my attachment, 24 designates a rack or container, which is placed upon the box 1 to increase the capacity thereof. Said rack consists of longitudinal and vertical slats 25 and 26, respectively, and is firmly secured to box 1 by metal straps 27 and bolts 28, which can be removed when it is desired to take the rack from the box 1, so that the manure spreader may carry out its usual function of spreading manure. Rack 24 is provided at one side with a door 29, which may be let down for convenience when loading straw into box 1 and the rack. Door 29 is secured at its lower side to the rack by hinges 30 and provided at its upper side with a latch 31 adapted to engage a keeper 32 and thus secure the door in closed position.

33 designates an inclined frame secured to opposite sides of the delivery end of rack 24 by bolts 34, and to box 1 by metallic straps 35, said frame being provided for the purpose of carrying, substantially, all the gearing of my attachment. Frame 33 is provided near its lower end with bearings 33ª, in which the counter shaft 20 is journaled.

36 designates a picker comprising a plurality of bars 37, hooks or teeth 38 secured to the faces of said bars, a multi-crank shaft 39, and a plurality of crank arms 40. Crank shaft 39 is operably-connected to the upper rear portion of the picker bars 37 by caps 41 and journaled at its ends in bearings 42 (Fig. 3), secured to the upper portion of the inclined frame 33. Crank arms 40 are pivotally connected at their free ends to the lower ends of the picker bars 37, and operably-mounted at their other ends upon a shaft 43, mounted in brackets 44, secured to frame 33. Shaft 43 is provided with spacing sleeves 45 to prevent lateral movement of said crank arms. One end of shaft 39 is provided with a fixedly-mounted sheave 46 driven by a crossed chain 47, which in turn is driven by a smaller sheave 48 fixedly-mounted upon one end of the counter shaft 20. Shaft 39 imparts a circular motion to the upper portions of the picker bars 37, whereas the crank arms 40, which run idle, impart a substantially, reciprocating motion to the lower portions of said picker bars, which combination of movements agitates and feeds the straw from the top of the load down to cylinder 5 in a uniform manner, so that said cylinder may distribute the straw equally over the surface of the ground.

49 designates a retarder to regulate the passage of the straw to the picker. Said retarder comprises a plurality of strips 50, a plurality of resilient fingers 51, and a cross bar 52 provided at its ends with trunnions 53, rockingly-mounted in a yoke 54 secured to the sides of the rack 24, see Figs. 2 and 3. Cross bar 52 of the retarder is provided near its ends with a pair of upwardly-extending arms 55, normally held in contact with the upper portion of yoke 54 by a pair of retractile springs 56, connected at their rear ends to eye-bolts 57, extending through lugs 58 and provided with nuts 59, so that they may be adjusted longitudinally to regulate the tension of the springs 56. Lugs 58 are secured to a transverse bar 60, secured to the upper ends of a pair of arms 61 secured to the sides of the rack 24.

62 designates a fender secured to each side of the delivery end of the rack 24, just above cylinder 5 to prevent the straw from spreading laterally and becoming entwined in the adjacent gearing.

63 designates a plurality of fingers secured to the end-gate 4 and extending upward into rack 24 to move the straw therein toward the cylinder 5.

In practice, the door 29 is lowered to the dotted position, Fig. 3, so that the straw can be readily thrown into rack 24, which is loaded to a level with the top thereof. The machine is then started forward and as the end-gate 4 and fingers 63 travel toward cylinder 5, they carry the straw therewith. As the straw moves forward, it packs against the retarder 49 until the strips 50 are swung behind the forward ends of the picker teeth 38, which at each downward stroke agitate and carry the top of the load downward to the cylinder 5 in a uniform manner, thereby insuring an equal distribution of straw upon the ground by said cylinder. As the picker bars move upward, they are carried backward behind the strips 50 of the retarder by the rotating crank shaft 39, so that the teeth 38 will not engage and carry the straw upward therewith.

While I have referred to my invention as an attachment for spreading straw, it is to be understood that it may be used to advantage in spreading hay or other fertilizing material over the surface of the soil.

I have shown and described the preferred form of my invention, but I of course, reserve the right to make such changes in construction, and arrangement of parts as properly fall within the spirit and scope of the appended claims.

Having thus described my invention, what I claim and desire to secure by Letters Patent, is:

1. In combination with a manure spreader having a cylinder and an apron, an attachment consisting of a container placed upon said manure spreader to increase the load capacity thereof, picker bars at the delivery end of said container, means on said picker bars to carry the material at the top of the load downward to the cylinder, a counter shaft adjacent said cylinder, gearing whereby said counter shaft is driven from the cylinder, gearing driven by said counter shaft for actuating the picker bars, and gearing driven by the counter shaft for actuating the apron.

2. In combination with a manure spreader having a cylinder, an attachment consisting of a container placed upon said manure spreader to increase the load capacity thereof, means at the delivery end of said container to carry the material at the top of the load downward to the cylinder, a cross bar pivotally-mounted in advance of said means, strips depending from said cross bar to regulate the passage of the material to said means, resilient fingers depending from the cross bar in advance of said strips to assist the latter in controlling the passage of the material to said means, and resilient members controlling said strips and fingers so that the same will offer resistance to the passage of the material to said means.

3. In combination with a manure spreader having a cylinder, an attachment consisting of a container placed upon said manure spreader to increase the load capacity thereof, a picker at the delivery end of said container to carry the material at the top of the load downward to the cylinder of the manure spreader, a yoke secured to the container a short distance in advance of said picker, a cross bar operably-mounted in said yoke, strips depending from said cross bar in advance of the picker, resilient fingers depending from the cross bar in advance of said strips, arms extending upward from the cross bar, springs secured to said arms to normally hold the same against the top of the yoke and cause the strips and the fingers to offer resistance to the passage of the material to the picker, and means for tensioning said springs.

4. In combination with a manure spreader having a cylinder, an apron provided with an end gate, an attachment consisting of a container placed upon said manure spreader to increase the load capacity thereof, and fingers extending upward into said container from the end gate to move the load in said container toward the cylinder, and means for actuating said fingers.

5. In combination with a manure spreader having a cylinder, an apron provided with an end gate, an attachment consisting of a container placed upon said manure spreader to increase the load capacity thereof, means at the delivery end of said container to carry the material at the top of the load downward to the cylinder, a retarder in advance of said means, and means secured to the end gate, said means extending upward into the container to move the load therein toward the cylinder.

In testimony whereof I affix my signature, in presence of two witnesses.

BENEDICT F. REICHENBERGER.

Witnesses:
HOWARD V. COX,
WM. FRANK SMITHSON.

Copies of this patent may be obtained for five cents each, by addressing the "Commissioner of Patents, Washington, D. C."